United States Patent
Brenan et al.

[11] Patent Number: 6,059,546
[45] Date of Patent: May 9, 2000

[54] CONTRACTILE ACTUATED BELLOWS PUMP

[75] Inventors: Colin J. H. Brenan, Marblehead; Serge R. Lafontaine, Watertown; Ian W. Hunter, Lincoln, all of Mass.

[73] Assignee: Massachusetts Institute of Technology, Cambridge, Mass.

[21] Appl. No.: 09/237,465

[22] Filed: Jan. 26, 1999

Related U.S. Application Data

[60] Provisional application No. 60/072,618, Jan. 26, 1998.

[51] Int. Cl.[7] ................................................. F04B 43/06
[52] U.S. Cl. ......................... 417/534; 417/393; 417/375; 417/473
[58] Field of Search ..................... 417/534, 473, 417/393, 395, 375, 512

[56] References Cited

U.S. PATENT DOCUMENTS

| | | | |
|---|---|---|---|
| 3,092,821 | 6/1963 | Muehlner | 417/393 |
| 3,791,768 | 2/1974 | Wanner | 417/393 |
| 3,936,244 | 2/1976 | Hilgert | 417/401 |
| 4,008,984 | 2/1977 | Scholle | 417/393 |
| 4,018,547 | 4/1977 | Rogen | 417/321 |
| 4,334,837 | 6/1982 | Inada et al. | 417/393 |
| 4,472,113 | 9/1984 | Rogen | 417/321 |
| 4,708,600 | 11/1987 | AbuJudom, II et al. | 417/322 |
| 4,811,564 | 3/1989 | Palmer | 60/527 |
| 4,983,876 | 1/1991 | Nakamura et al. | 310/328 |
| 5,141,412 | 8/1992 | Meinz | 417/473 |
| 5,205,819 | 4/1993 | Ross et al. | 604/67 |
| 5,215,446 | 6/1993 | Takahashi et al. | 417/322 |
| 5,391,060 | 2/1995 | Kozumplik, Jr. et al. | 417/393 |
| 5,435,152 | 7/1995 | McCausland | 62/467 |
| 5,480,292 | 1/1996 | Chevallier | 417/393 |
| 5,558,506 | 9/1996 | Simmons et al. | 417/393 |
| 5,567,118 | 10/1996 | Grgurich et al. | 417/46 |
| 5,622,482 | 4/1997 | Lee | 417/321 |
| 5,626,581 | 5/1997 | Stachlin et al. | 606/63 |
| 5,659,171 | 8/1997 | Young et al. | 250/289 |

FOREIGN PATENT DOCUMENTS

| | | |
|---|---|---|
| 0 709 573 A1 | 5/1996 | European Pat. Off. . |
| WO 96/34637 | 11/1996 | WIPO . |

*Primary Examiner*—Charles G. Freay
*Assistant Examiner*—Robert Z. Evora
*Attorney, Agent, or Firm*—Bromberg & Sunstein LLP

[57] ABSTRACT

A pump for impelling a fluid includes a first variable volume, the first variable volume having a first inlet for allowing the influx of the fluid into the first variable volume and a first outlet for allowing the efflux of the fluid out of the first variable volume and a first membrane defining at least a portion of the first variable volume. The pump also includes a first contractile actuator, for displacing the first membrane from a first position to a second position in such a manner as to vary the first variable volume and a second contractile actuator, for restoring the first membrane from the second position to the first position in such a manner as to vary the first variable volume. A first check valve is coupled to the first inlet for regulating the influx of fluid into the first variable volume through the first inlet and a second check valve is coupled to the first outlet for regulating the efflux of the fluid out of the first variable volume through the first outlet. In a preferred embodiment, at least one of the first and second contractile actuators is a linear actuator.

8 Claims, 3 Drawing Sheets

CONTRACTILE ACTUATED BELLOWS PUMP

The present application claims priority from U.S. provisional application Ser. No. 60/072,618, filed Jan. 26, 1998, which is herein incorporated by reference.

This invention was made with government support under Grant Number DAMD17-98-2-8003 awarded by the U.S. Department of the Army. The government has certain rights in the invention.

TECHNICAL FIELD

The present invention pertains to a pump, and, more particularly, to a bellows pump actuated by opposing linear contractile members such as a shape memory alloy or conductive polymer.

BACKGROUND

Pumps are devices which impart motion to a fluid, including either a gas, a liquid, or a slurry (mixtures of solids and liquids). One method of imparting motion to a fluid is through the movement of a membrane, piston or diaphragm. An actuator may be used to provide the force necessary to cause the motion or displacement of the membrane, piston or diaphragm. Several prior art pumps utilize a shape memory alloy actuator (See U.S. Pat. No. 5,045,064, "Constant Pressure Implantable Pump Reservoir and U.S. Pat. No. 5,622,484 "Pump Using Shape Memory Alloys".) These actuators, however, typically use a passive element to provide the necessary restoring force for the shape memory alloy actuator.

It is well known that work may be extracted from the class of shape memory alloys (SMAs) which includes the nickel/titanium alloy sold as Nitinol, as well as other metallic alloys such as InTl, CuZn, NiAl, AgZn, AgCd, and others. Numerous shape memory alloys are discussed in H. Funakubo (ed.) *Shape Memory Alloys* (Gordon and Breach, 1987), which is incorporated herein by reference. Common to these materials is the large change in Young's modulus as each material undergoes a martenistic phase transition from a martenistic phase (at lower temperature) to austenite (at higher temperature). If the material undergoes elongation on heating under compression, or contraction on cooling under tension, mechanical work is provided. It is known that strain may be applied to shape memory alloys, and work may be derived therefrom, in tension, compression, torsion, flexion, etc.

Other types of contractile materials include magnetostrictive material and electroactive contractile materials such as conducting polymers and piezoelectric material. Some common conductive polymers which exhibit conductive electrical properties include, for example, polyaniline, polypyrrole and polyacetylene.

SUMMARY OF THE INVENTION

In accordance with one aspect of the invention, in a preferred embodiment, there is a pump for impelling a fluid. The pump has a first variable volume, the first variable volume having a first inlet for allowing the influx of the fluid into the first variable volume and a first outlet for allowing the efflux of the fluid out of the first variable volume. Additionally, the pump has a first membrane defining at least a portion of the first variable volume, a first contractile actuator, for displacing the first membrane from a first position to a second position in such a manner as to vary the first variable volume and a second contractile actuator, for restoring the first membrane from the second position to the first position in such a manner as to vary the first variable volume. The pump also has a first check valve coupled to the first inlet for regulating the influx of fluid into the first variable volume through the first inlet and a second check valve coupled to the first outlet for regulating the efflux ot the fluid out of the first variable volume through the first outlet.

In a preferred embodiment, at least one of the first and second contractile actuators is a linear actuator. In accordance with alternate embodiments, the pump may include a second variable volume, the second variable volume having a second inlet for allowing the influx of fluid into the second variable volume and a second outlet for allowing the efflux of fluid out of the second volume and a second membrane defining at least a portion of the second variable volume. Additionally, the pump may include a coupling member having a first end and a second end, the first end of the coupling member coupled to the first membrane and the second end of the coupling member coupled to the second membrane such that when the first membrane is displaced so as to increase the first variable volume, the first contractile actuator restores the second membrane so as to decrease the second variable volume and when the first membrane is restored so as to decrease the first variable volume, the second contractile actuator displaces the second membrane so as to increase the second variable volume. In addition the pump includes a third check valve coupled to the second inlet for regulating the influx of fluid into the second variable volume through the second inlet and a fourth check valve coupled to the second outlet for regulating the efflux of fluid out of the second variable volume through the second outlet.

In accordance with an alternative embodiment, a pump for impelling a fluid includes a housing having an interior wall, a first piston disposed within the housing so as to substantially fill the cross-section of the housing and a first variable volume formed between the housing and the first piston, the first variable volume having a first inlet for allowing the influx of the fluid into the first variable volume and a first outlet for allowing the efflux of the fluid out of the first variable volume, Additionally, the pump has a first contractile actuator, for displacing the first piston from a first position to a second position in such a manner as to vary the first variable volume, a second contractile actuator, for restoring the first piston from the second position to the first position in such a manner as to vary the first variable volume, a first check valve coupled to the first inlet for regulating the influx of fluid into the first variable volume through the first inlet and a second check valve coupled to the first outlet for regulating the efflux of the fluid out of the first variable volume through the first outlet.

In a preferred embodiment, at least one of the first and second contractile actuators is a linear actuator. In accordance with a further embodiment, the pump may include a first membrane coupled to the interior wall of the housing and the first piston such that the first membrane is driven by the first piston in such a manner as to vary the first variable volume, the first membrane for preventing the flow of fluid between the first piston and the housing.

In accordance with a further embodiment, the pump may further include a second piston disposed within the housing so as to substantially fill the cross-section of the housing, a second variable volume formed between the housing and the second piston, the second variable volume having a second inlet for allowing the influx of fluid into the second variable volume and a second outlet for allowing the efflux of fluid out of the second volume and a coupling member having a first end and a second end, the first end of the coupling member coupled to the first piston and the second end of the coupling member coupled to the second piston such that when the first piston is displaced so as to increase the first variable volume, the first contractile actuator restores the second piston so as to decrease the second variable volume and when the first piston is restored so as to decrease the first variable volume, the second contractile actuator displaces the second piston so as to increase the second variable volume. The pump also includes a third check valve coupled to the second inlet for regulating the influx of fluid into the second variable volume through the second inlet and a fourth check valve coupled to the second outlet for regulating the efflux of fluid out of the second variable volume through the second outlet.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENT

Figure 1:
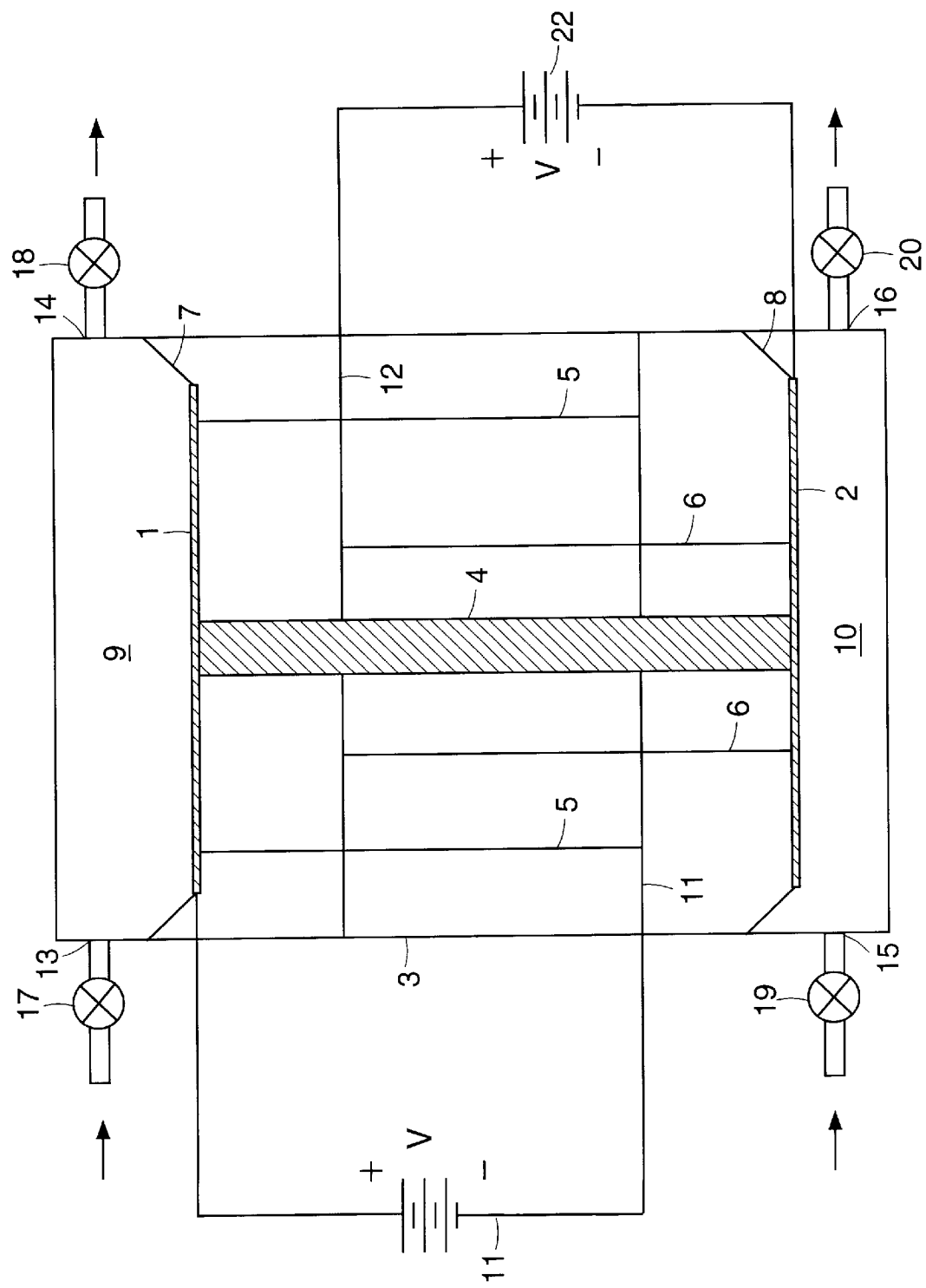
FIG. 1 is a schematic drawing of a pump for impelling a fluid in accordance with a preferred embodiment of the invention.

Optimization of pump performance parameters (i.e. flow rate, outlet pressure, physical size and weight, power consumption, noise) comes from a mechanical design that exploits the physical attributes of the actuators used to displace the pump membrane. Many applications require a pump that is lightweight yet can pump fluids at high mass flow rates and outlet pressures. To achieve these design objectives, actuators having a high power-to-mass ratio (stress x strain rate) and capable of generating high stresses and strains are needed. These properties are inherent to many different classes of actuators but only in high aspect ratio geometries such as fibers or films. Consequently, actuators of this type typically generate substantial contractile forces but considerably weaker expansion forces. Muscle is a good example in that it can produce only contractile forces and an antagonistic pair of muscles is necessary to effect rotational motion about a joint. Conducting polymers in either wire or film geometry are another example since it can generate large contractile forces but much smaller forces on expansion. Shape memory alloy fibers or films also produce large contractile forces and have high strain rates on heating above the phase transition temperature but on cooling below this temperature they retain the high temperature shape. An external force applied along the fiber or film axis in the low temperature phase returns the material to its original low temperature length.

Exploitation of the desirable physical properties of these actuators therefore necessitates a mechanical design in which a restoring force is applied to the contracted actuator to return it to its original length. A passive spring mechanism can perform this function but it is undesirable because the power-to-mass ratio, stress and strain on elongation are determined by the combined passive properties of the spring and actuator. A better approach is to utilize an antagonistic or opposing set of actuators stimulated to contract in such a way that the combined actuator properties in contraction and elongation generate the stress, strain, and power-to-mass ratio required for optimal pump operation for a given application. Pump parameters optimized in this manner include pumping rate, outlet pressure, power consumption, physical size and weight.

A second important benefit of the mechanical design described herein is its scaleability to different sizes. Of greatest interest is in making the pump mechanism small so that it is easily transported and be included in equipment requiring a pump. Selection of high power-to-mass ratio actuators, such as shape memory alloy actuators, and integration into an opposing actuator configuration decreases the total actuator mass required to achieve a specified pump rate and outlet pressure. A pump configured in this manner is also of low mass.

A third important benefit of the mechanical design described herein is the isolation of the contractile actuators from the fluid stream pumped by the pump. In contact with the fluid streams are the enclosure walls, the moveable membrane and the flexible couplings. The materials comprising these pump elements can be chosen such that they do not react physically or chemically with the materials passed through the pump.

FIG. 1 is a schematic diagram of a pump for impelling fluid in accordance with a preferred embodiment of the invention. The pump shown in FIG. 1 is a bellows type pump. The pump has a first variable volume 9 and a second variable volume 10 which may be varied by the displacement of one or more of the walls defining the variable volume. A first membrane 1 and a second membrane 2 are surfaces which may be displaced in order to cause a change in a volume. As used in this description and the following claims, a "membrane" is a material at least a portion of which is flexible, a wall at least a portion of which is flexible, a piston or a solid plate surrounded by a flexible boot.

In FIG. 1, the first variable volume 9 is defined by a first membrane 1 and a housing 3 and the second variable volume 10 is defined by a second membrane 2 and the housing 3. Fluid is pumped by displacing the first membrane 1 and the second membrane 2 in order to vary the first variable volume 9 and the second variable volume 10 respectively. In a preferred embodiment, the first membrane 1 and the second membrane 2 are formed using a plate attached to a flexible elastic coupling attached to the housing 3.

Fluid enters the first variable volume 9 through a first inlet 13 and is expelled from the first variable volume 9 through a first outlet 14. A first check valve 17 is coupled to the first inlet 13 in order to allow the influx of fluid into the first variable volume 9 through the first inlet 13 while preventing the efflux of fluid from the first variable volume 9 through the first inlet 13. A second check valve 18 is coupled to the first outlet 14 in order to allow the efflux of fluid from the first variable volume 9 while preventing the influx of fluid into the first variable volume 9 through the first outlet 14. In a preferred embodiment, the first check valve 17 and the second check valve 18 are passive check valves. When a pressure difference is imposed across a passive check valve in one direction, the valve closes, and when the pressure difference is imposed across the passive check valve in the opposite direction, the valve opens. In an alternative embodiment, the first check valve 17 and the second check valve 18 are valves opened and closed through application of an electrical command signal. An example of such a valve is an electrically-activated solenoid valve. The first check valve 17 and the second check valve 18 are arranged such that when one valve is closed the other valve is open such as to allow the one way flow of fluid from the first inlet 13, through the first variable volume 9 and through the first outlet 14.

Fluid enters the second variable volume 10 through a second inlet 15 and is expelled from the second variable volume 10 through a second outlet 16. A third check valve 19 is coupled to the second inlet 15 in order to allow the influx of fluid into the second variable volume 10 through the second inlet 15 while preventing the efflux of fluid from the second variable volume 10 through the first inlet 15. A fourth check valve 20 is coupled to the second outlet 16 in order to allow the efflux of fluid from the second variable volume 10 while preventing the influx of fluid into the second variable volume 10 through the second outlet 16. In a preferred embodiment, the third check valve 19 and the fourth check valve 20 are passive check valves as described above. In an alternative embodiment, the third check valve 19 and the fourth check valve 20 are valves opened and closed through application of an electrical command signal. An example of such a valve is an electrically-activated solenoid valve. The third check valve 19 and the fourth check valve 20 are arranged such that when one valve is closed the other valve is open such as to allow the one way flow of fluid from the second inlet 15, through the second variable volume 10 and through the second outlet 16.

Fluid is pumped by displacing the first membrane 1 and the second membrane 2. The first membrane 1 and the second membrane 2 are displaced using a first contractile actuator 5 and a second contractile actuator 6 which are disposed within the housing 3. The first contractile actuator 5 is coupled to the first membrane 1 and a first disk 11 while the second contractile actuator 6 is coupled to the second membrane 2 and a second disk 12. In one embodiment, the first disk 11 and the second disk 12 are made of a conducting material such as aluminum. In an alternative embodiment, the first disk 11 and the second disk 12 are made of a non-conducting stiff material and the linear actuators are electrically connected by conducting wires to a voltage source (21 or 22). The conducting wires are used to connect an electrical voltage as described below. In a preferred embodiment, the first contractile actuator 5 and the second contractile actuator 6 consist of one or more fibers or wires which are distributed so that a uniform force is applied to both the first membrane 1 and the second membrane 2. In a further preferred embodiment, the first contractile actuator 5 and the second contractile actuator 6 are linear actuators. As used in this description and the following claims, a linear actuator is an actuator for which the dimensional change along one axis of the actuator may be controlled. Examples of linear actuators are shape memory alloys, conductive polymers, piezoelectric material and magnetostrictive material.

In FIG. 1, a coupling member 4 is used to couple the first membrane 1 and the second membrane 2 so that the membranes are displaced in a single motion. In a preferred embodiment, the coupling member 4 is a rod made from a rigid non-conducting material such as Delrin™. The first contractile actuator 5 and the second contractile actuator 6 produce opposing forces in order to displace the first membrane 1 and the second membrane 2. The first contractile actuator 5 and the second contractile actuator 6 are arranged so that the alternate contraction and relaxation of the first contractile actuator 5 and the second contractile actuator 6 fills one variable volume with fluid while the fluid in the other variable volume is evacuated. In other words, the actuator configuration is such that the filling and evacuation of each volume is 180 degrees out-of-phase with respect to each other.

When the first contractile actuator 5 is caused to contract, membrane 1 is displaced in a manner to vary the first variable volume 9. The first membrane 1 is displaced by an amount equal to the length change in the first contractile actuator 5. At the same time, the contraction of the first contractile actuator 5 provides a restoring force for the second contractile actuator 6, causing the second contractile actuator 6 to elongate and displace membrane 2 so as to vary the second variable volume 10.

In a similar manner, the second contractile actuator 6 acts to displace the second membrane 2 and also provide a restoring force for the first contractile actuator 5. As the second contractile actuator 5 is caused to contract, the second membrane 2 is displaced in a manner to vary the second variable volume 10. At the same time, the second contractile actuator 6 provides a restoring force for the first contractile actuator 5, causing the first contractile actuator 5 to elongate so as to displace membrane 1 and vary the first variable volume 9. In this manner, the first contractile actuator 5 and the second contractile actuator 6 act in opposition to one another. Using an opposing pair of contractile actuators results in large axial forces applied to the membranes.

In FIG. 1, a small annulus 7 of membrane between the interior wall of the housing 3 and the first membrane 1 ensures the flexure of the membrane over the displacement range of the first contractile actuator 5 and the second contractile actuator 6. A small annulus of membrane 8 between the interior wall of the housing 3 and the second membrane 2 ensures the flexure of the second membrane 2 over the displacement range of the first contractile actuator 5 and the second contractile actuator 6.

In a preferred embodiment utilizing shape memory alloy actuators, an electrical potential may be used to cause the contraction of the first contractile actuator 5 and the second contractile actuator 6 as shown in FIG. 1. A first voltage 21 is applied between the first contractile actuator 5 and the first disk 11. A second voltage 22 is applied between the second contractile actuator 6 and the second disk 12. Stimulation of the first contractile actuator 5 occurs when the first voltage 21 is applied. The first membrane 1 is then displaced by an amount equal to the length change of the first contractile actuator. The first voltage 21 will be removed from the first contractile actuator 5 before the second voltage 22 is applied to the second contractile actuator 6 so that the first contractile actuator may cool and be restored to its original length by the restoring force provided by the second contractile actuator 6.

Figure 2:
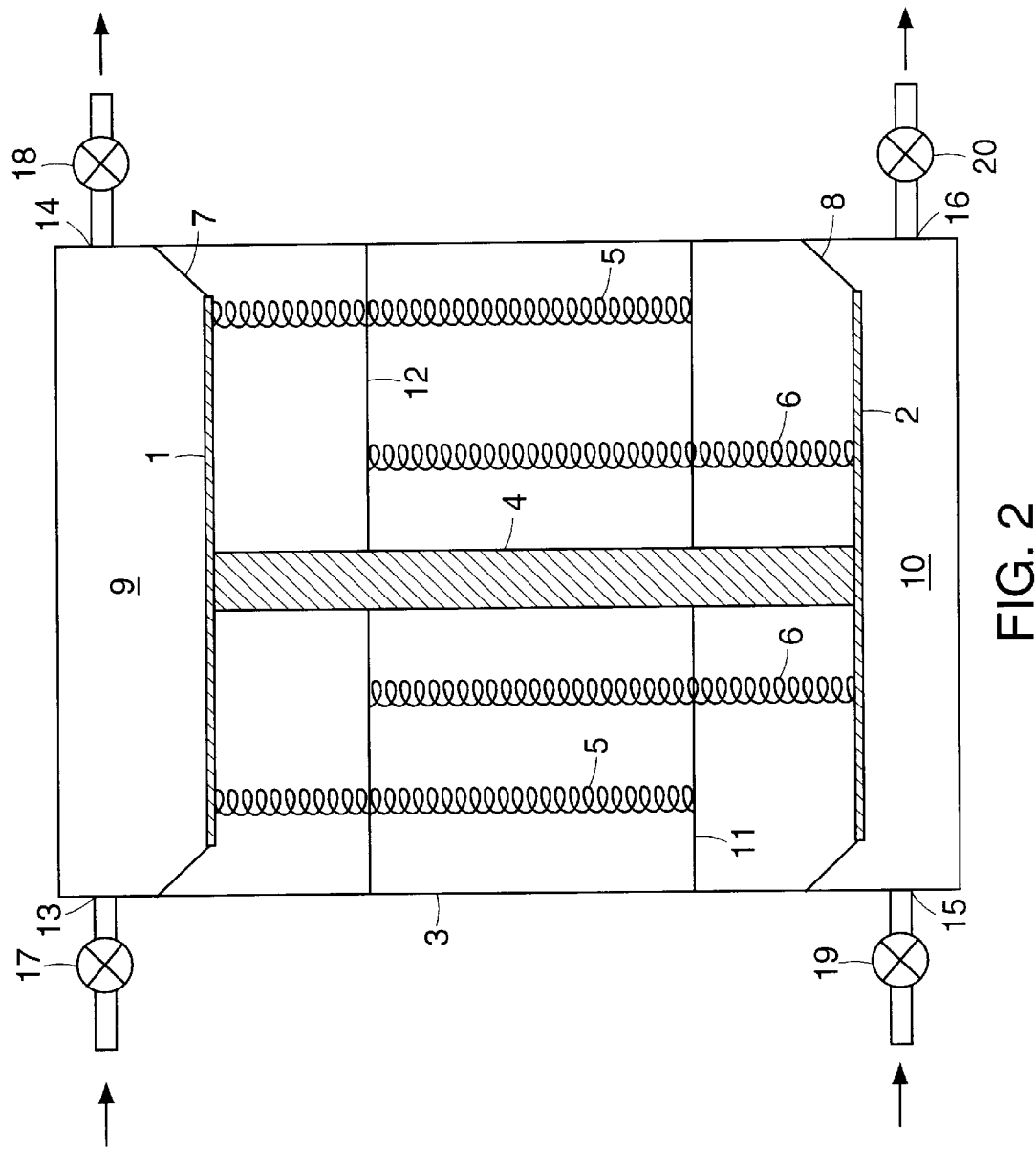
FIG. 2 is a schematic drawing of a pump for impelling a fluid in accordance with an alternative embodiment of the invention.

FIG. 2 is a schematic diagram of a pump for impelling fluid in accordance with an alternative embodiment of the invention. In FIG. 2, the first contractile actuator 5 and the second contractile actuator 6 are springs. The fractional contraction of the actuators may thereby be increased. The operation of the pump as shown in FIG. 2 is as described with respect to FIG. 1 above.

Figure 3:
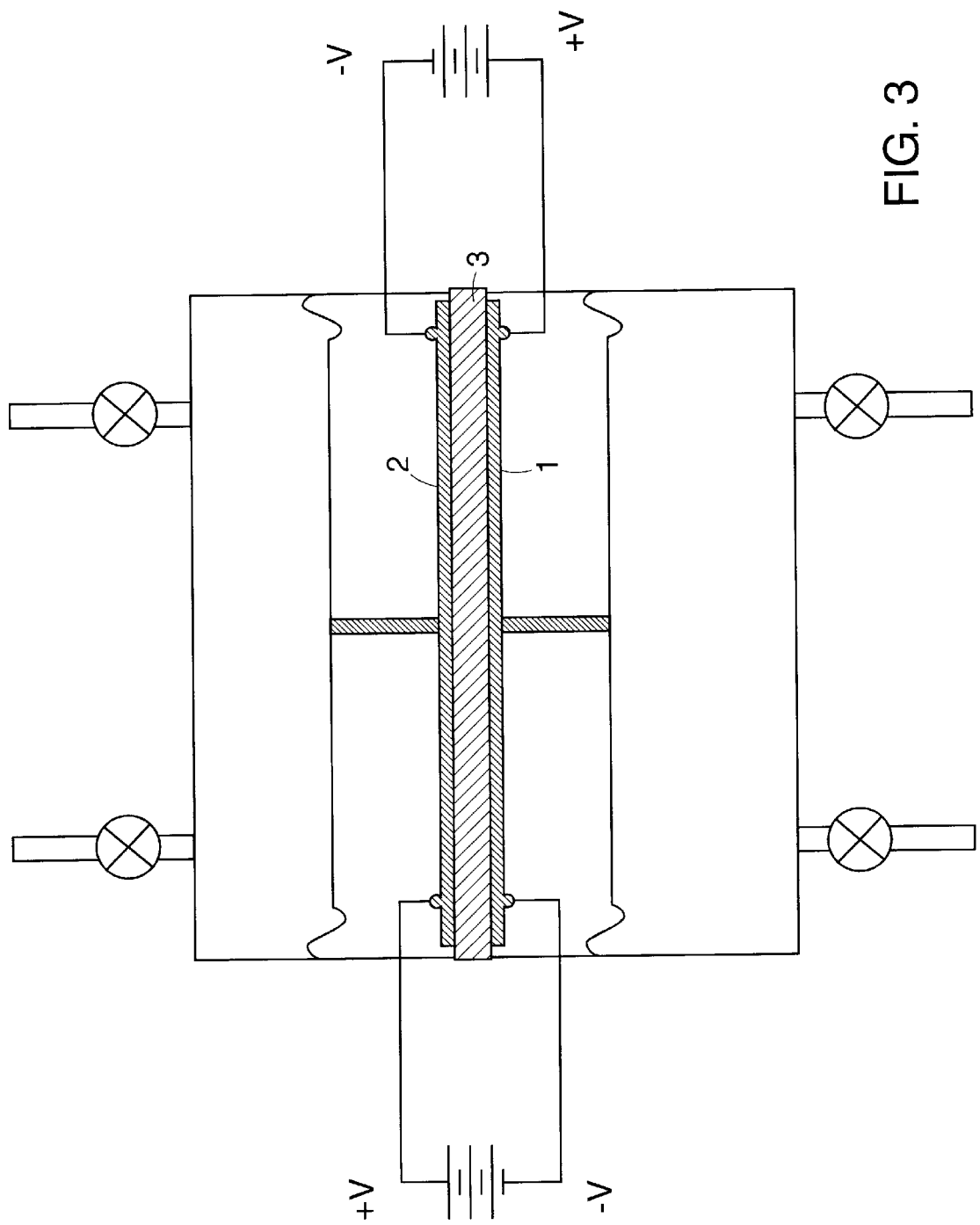
FIG. 3 is a schematic drawing of a pump for impelling a fluid in accordance with an alternative embodiment of the invention

FIG. 3 is a schematic drawing of a pump for impelling a fluid in accordance with another alternative embodiment of the invention. In FIG. 3, the first contractile actuator 1 and the second contractile actuator 2 are thin films of shape memory alloy deposited onto the top and bottom surfaces of a flexibly elastic plate 3. Alternatively heating and cooling the first contractile actuator 1 and the second contractile actuator 2 deflects the plate so as to effect a similar pumping action as described with respect to FIGS. 1 and 2 above.

While the invention is described in detail herein, it is to be clearly understood that the same is by way of illustration and example and is not to be taken by way of limitation. Indeed, numerous variations and modifications will be apparent to those skilled in the art. All such variations and modifications are intended to be within the scope of the present invention as defined in the appended claims.

What is claimed is:

1. A pump for impelling a fluid, the pump comprising:
   a first variable volume, the first variable volume having a first inlet for allowing the influx of the fluid into the first variable volume and a first outlet for allowing the efflux of fluid out of the first variable volume;
   a first membrane defining at least a portion of the first variable volume;
   a first contractile actuator, for displacing the first membrane from a first position to a second position to vary the first variable volume;
   a second contractile actuator, for restoring the first membrane from the second position to the first position to vary the first variable volume;
   a voltage source coupled to the first contractile actuator and the second contractile actuator, the voltage source for causing the alternating contraction of the first and second contractile actuators;
   a first check valve coupled to the first inlet for regulating the influx of the fluid into the first variable volume through the first inlet; and
   a second check valve coupled to the first outlet for regulating the efflux of the fluid out of the first variable volume through the first outlet;
   wherein at least one of the first and second contractile actuators is a linear actuator selected from the group consisting of a shape memory alloy actuator and a conducting polymer actuator.

2. A pump according to claim 1, further including:
   a second variable volume, the second variable volume having a second inlet for allowing the influx of fluid into the second variable volume and a second outlet for allowing the efflux of fluid out of the second variable volume;
   a second membrane defining at least a portion of the second variable volume;
   a coupling member having a first end and a second end, the first end of the coupling member coupled to the first membrane and the second end of the coupling member coupled to the second membrane such that when the first membrane is displaced to increase the first variable volume, the first contractile actuator restores the second membrane to decrease the second variable volume and when the first membrane is restored to decrease the first variable volume, the second contractile actuator displaces the second membrane to increase the second variable volume;
   a third check valve coupled to the second inlet for regulating the influx of fluid into the second variable volume through the second inlet; and
   a fourth check valve coupled to the second outlet for regulating the efflux of fluid out of the second variable volume through the second outlet.

3. A pump according to claim 1, wherein the voltage source comprises a first voltage source coupled to the first contractile actuator and a second voltage source coupled to the second contractile actuator.

4. A pump for impelling a fluid, the pump comprising:
   a housing having an interior wall;
   a first piston disposed within the housing such that the first piston substantially fills the cross-section of the housing;
   a first variable volume formed between the housing and the first piston, the first variable volume having a first inlet for allowing the influx of the fluid into the first variable volume and a first outlet for allowing the efflux of the fluid out of the first variable volume;
   a first contractile actuator, for displacing the first piston from a first position to a second position to vary the first variable volume;
   a second contractile actuator, for restoring the first piston from the second position to the first position to vary the first variable volume;
   a voltage source coupled to the first contractile actuator and the second contractile actuator, the voltage source for causing the alternating contraction of the first and second contractile actuators;
   a first check valve coupled to the first inlet for regulating the influx of fluid into the first variable volume through the first inlet; and
   a second check valve coupled to the first outlet for regulating the efflux of the fluid out of the first variable volume through the first outlet;
   wherein at least one of the first and second contractile actuators is a linear actuator selected from the group consisting of a shape memory alloy actuator and a conducting polymer actuator.

5. A pump according to claim 4, further including a first membrane coupled to the interior wall of the housing and the first piston such that the first membrane is driven by the first piston to vary the first variable volume, the first membrane for preventing the flow of fluid between the first piston and the housing.

6. A pump according to claim 4, further including:
   a second piston disposed within the housing such that the second piston substantially fills the cross-section of the housing;
   a second variable volume formed between the housing and the second piston, the second variable volume having a second inlet for allowing the influx of fluid into the second variable volume and a second outlet for allowing the efflux of fluid out of the second volume;
   a coupling member having a first end and a second end, the first end of the coupling member coupled to the first piston and the second end of the coupling member coupled to the second piston such that when the first piston is displaced to increase the first variable volume, the first contractile actuator restores the second piston to decrease the second variable volume and when the first piston is restored to decrease the first variable volume, the second contractile actuator displaces the second piston to increase the second variable volume;
   a third check valve coupled to the second inlet for regulating the influx of fluid into the second variable volume through the second inlet; and
   a fourth check valve coupled to the second outlet for regulating the efflux of fluid out of the second variable volume through the second outlet.

7. A pump according to claim 6, further including a second membrane coupled to the interior wall of the housing and the second piston such that the second membrane is driven by the second piston to vary the second variable volume, the second membrane for preventing the flow of fluid between the second piston and the housing.

8. A pump according to claim 4, wherein the voltage source comprises a first voltage source coupled to the first contractile actuator and a second voltage source coupled to the second contractile actuator.

* * * * *